United States Patent [19]

Landoll et al.

[11] Patent Number: 4,556,357
[45] Date of Patent: Dec. 3, 1985

[54] TRUCK HAVING ARTICULATED CHASSIS FOR HAULING GOODS

[75] Inventors: Donald R. Landoll; David J. Kongs; Alfred R. Belknap, all of Marysville, Kans.

[73] Assignee: Landoll Corporation, Marysville, Kans.

[21] Appl. No.: 600,951

[22] Filed: Apr. 16, 1984

[51] Int. Cl.$^4$ .............................................. B60P 1/20
[52] U.S. Cl. ..................................... 414/469; 298/22 J
[58] Field of Search ............... 414/435, 469, 477–480, 414/483; 298/20 R, 22 D, 22 J, 22 AE

[56] References Cited

U.S. PATENT DOCUMENTS

| | | |
|---|---|---|
| 2,466,452 | 4/1949 | Lisota . |
| 2,812,088 | 11/1957 | Cadillac et al. ................ 298/22 AE |
| 3,159,294 | 12/1964 | Forsythe, Jr. . |
| 3,485,400 | 12/1969 | Pewthers . |
| 3,690,490 | 9/1972 | Hall . |
| 4,260,315 | 4/1981 | Bouffard . |

Primary Examiner—Robert G. Sheridan
Attorney, Agent, or Firm—Schmidt, Johnson, Hovey & Williams

[57] ABSTRACT

A truck in the nature of an automotive vehicle for carrying and moving heavy loads, bulky articles, freight, etc., has a wheeled front section which includes a cab and an engine compartment and a wheeled rear section which includes a cargo-receiving bed. The two sections are articulated to permit raising of the truck at the articulation or joint between the sections, causing the front section to slope downwardly and forwardly from the joint and the rear section to slope downwardly and rearwardly from the joint, resulting in the bed being positioned in a small angle of inclination relative to the plane of the surface which supports the truck such as to facilitate loading and unloading. The bed is reciprocable fore and aft of the rear section by use of hydraulic power means for placing its rear ramp against such surface, and a linkage system, also hydraulically powered, effects the tilting operation.

6 Claims, 11 Drawing Figures

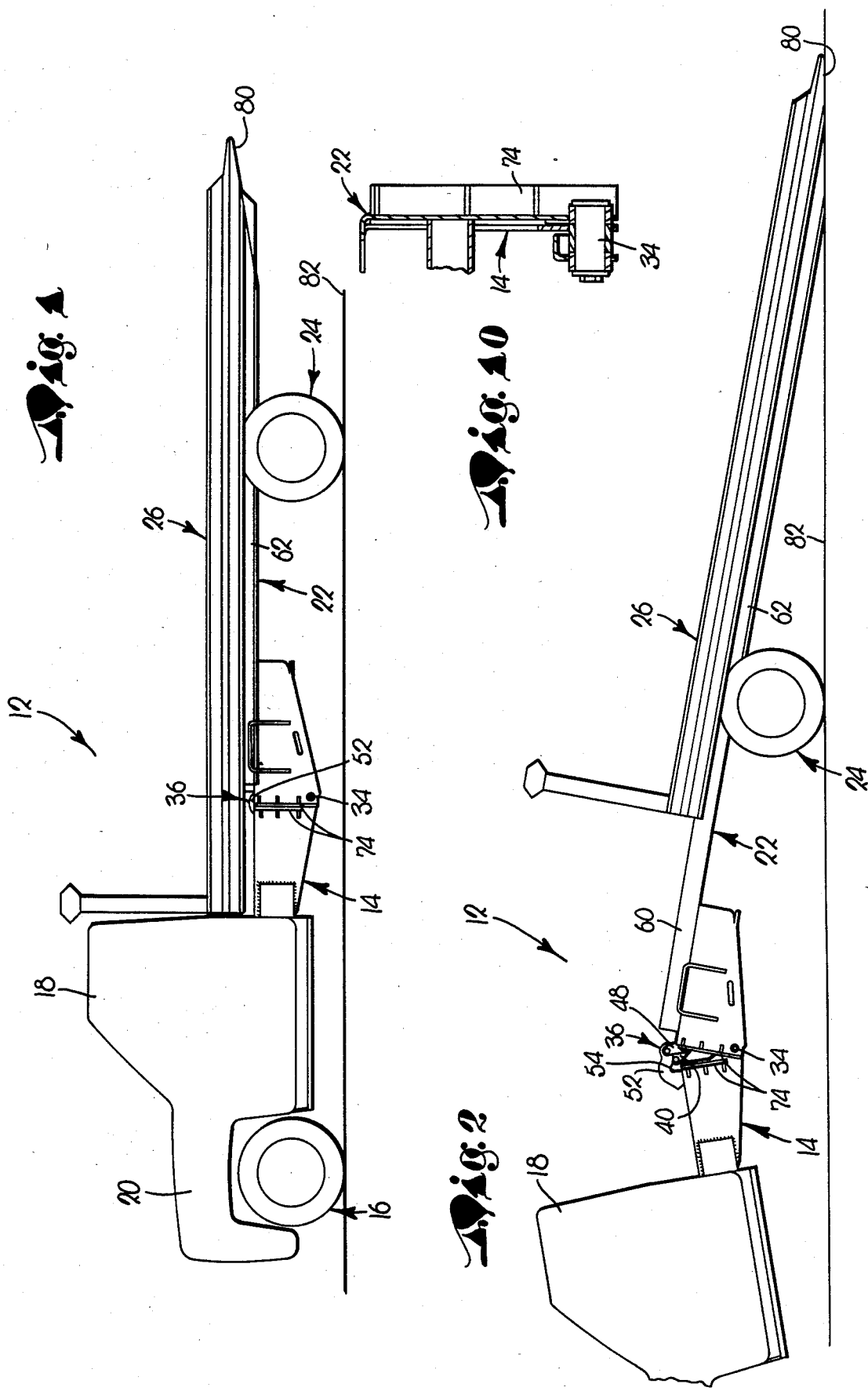

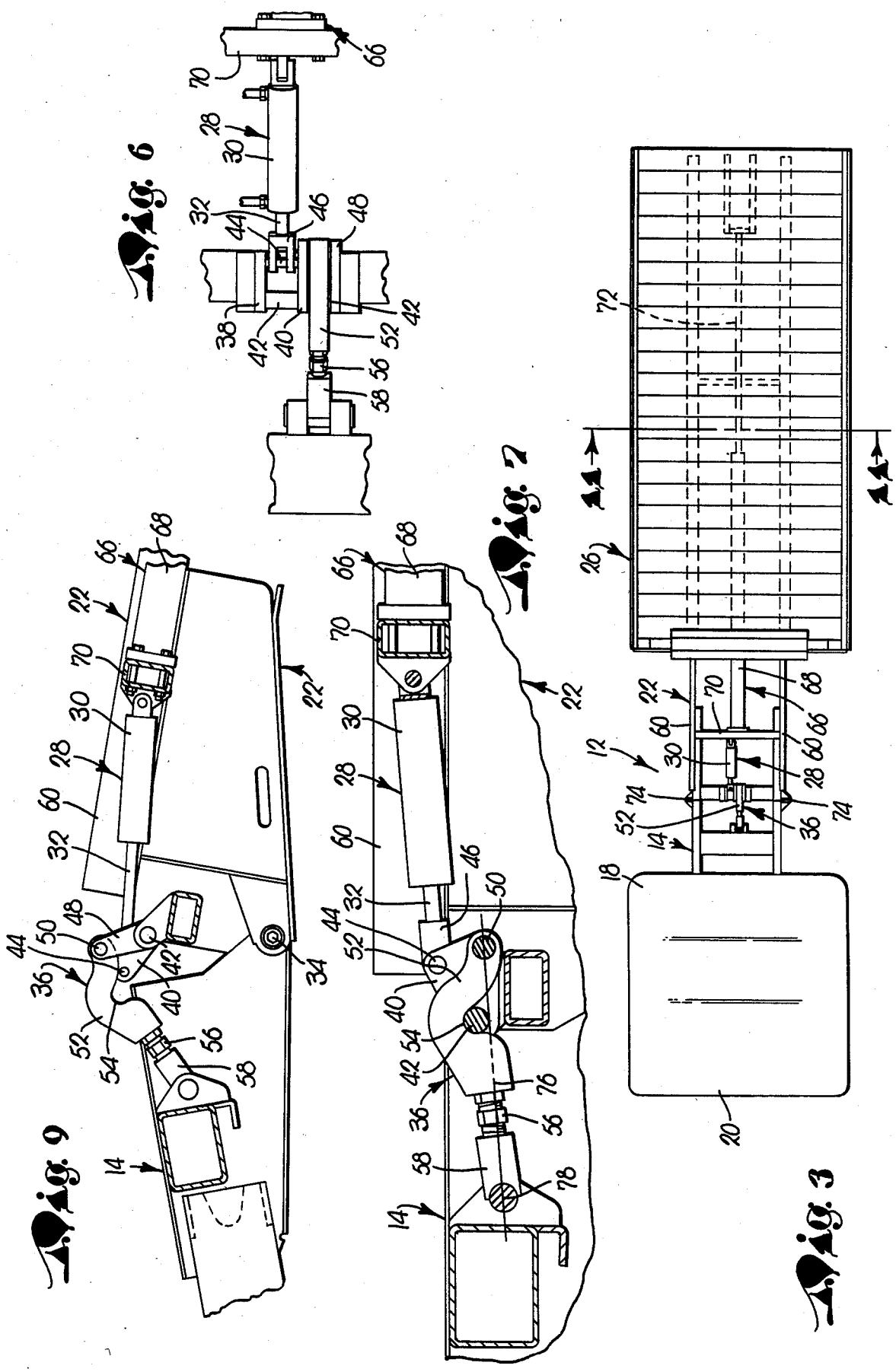

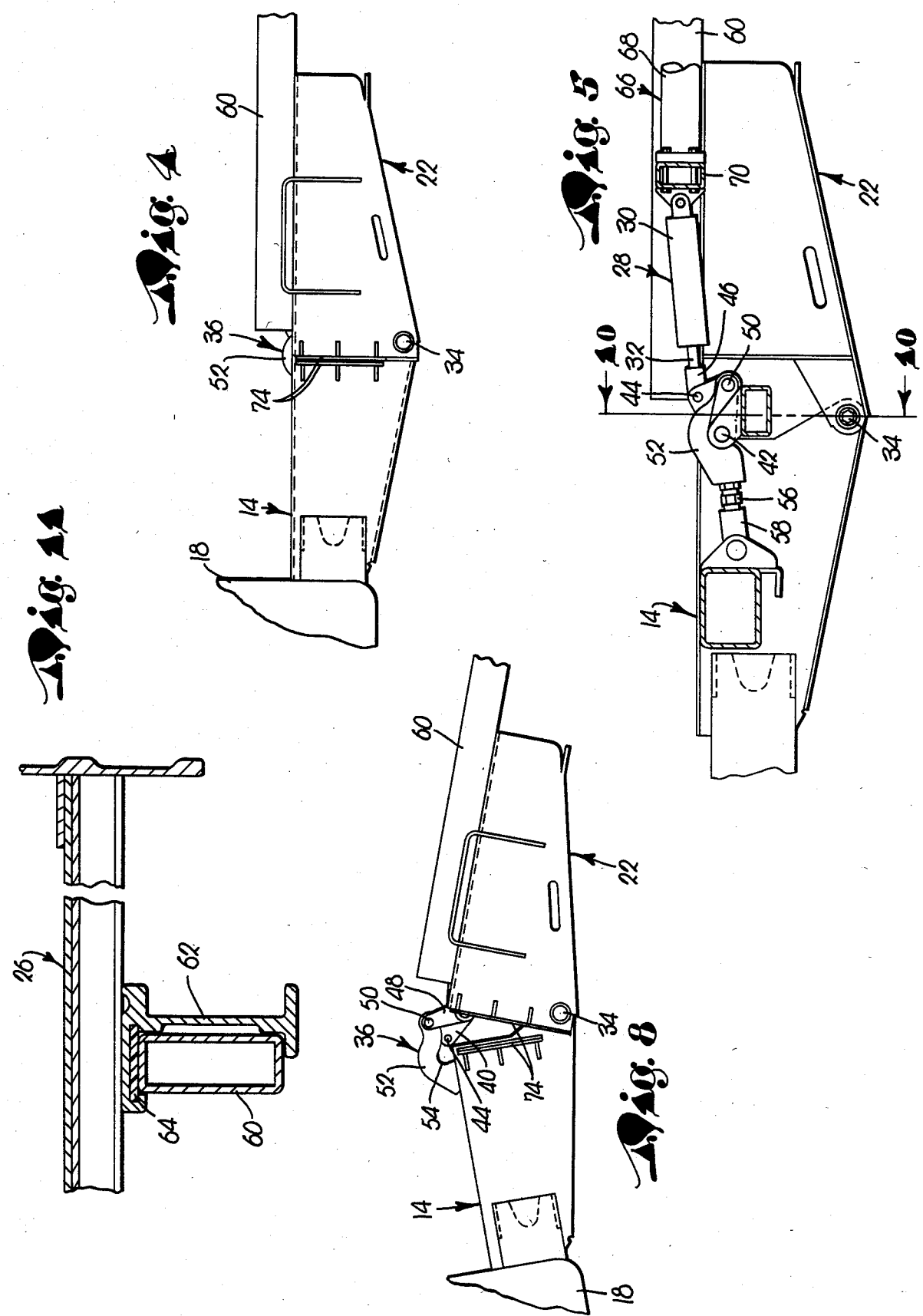

TRUCK HAVING ARTICULATED CHASSIS FOR HAULING GOODS

Over-the-road vehicles for hauling cargo include not only those which have tiltable beds but those having towed trailers which may, of themselves, also be tilted to place their beds on an incline for purposes of loading and unloading. The difficulty is that the angle of inclination of the beds remains much too steep to permit proper and convenient handling of many types of cargo, and attempts to solve the problem have heretofore been quite unsuccessful.

By way of example, there are many types of automobiles, farm implements, lawn and garden equipment, tractors and the like, mobile and otherwise, so constructed that, when driven, towed or pushed onto the rather steeply inclined beds, come into contact with the bed before they commence to rise sufficiently to provide clearance. That is to say, for example, when the bumper of a car rams into the bed before its front wheels engage the ramp of the bed to commence the raising of the front end of the vehicle, the bed inclination is too steep and the problem needs to be solved.

We provide the solution by tilting not only the bed but the cab and engine compartment simultaneously such as to substantially reduce the angle of inclination of the bed to a far greater extent than has heretofore been made possible in hauling vehicles of any type. And, as an important adjunct, the rear ramp end of the bed can be brought into a ground-engaging position by rearward sliding of the bed such that all types of freight can be quickly and easily loaded onto the tilted bed without difficulty.

The zone of articulation between the front wheeled frame and the rear, bed-supporting, wheeled frame is located immediately behind the cab such that both frames are caused to tilt, but in opposite directions, upon action of a hydraulic power assembly connected with a novel linkage system between the pivotally interconnected frames. Separate power means is provided for reciprocating the bed along the rear frame.

In the drawings:

FIG. 1 is a side elevational view of an automatic truck for hauling goods made pursuant to our present invention showing the same in its normal over-the-road position;

FIG. 2 is a fragmentary side elevational view showing the truck in position for loading and unloading cargo;

FIG. 3 is a top plan view of the truck in the position shown in FIG. 2;

FIG. 4 is an enlarged, fragmentary, side elevational view similar to FIG. 1 but with the truck bed and the rear undercarriage omitted;

FIG. 5 is a fragmentary side elevational view similar to FIG. 4, still further enlarged, parts being broken away and in section to reveal details of construction;

FIG. 6 is an enlarged, fragmentary, top plan view similar to FIG. 3 showing certain details of construction of the tilting mechanism;

FIG. 7 is a view similar to FIG. 5, still further enlarged, parts being broken away and in section for clearness;

FIG. 8 is an enlarged, fragmentary, side elevational view similar to FIG. 2, the bed and rear undercarriage being omitted as in FIG. 4;

FIG. 9 is a view similar to FIG. 8, still further enlarged, parts being broken away and in section to illustrate details of construction;

FIG. 10 is a fragmentary, cross sectional view taken on line 10—10 of FIG. 5; and FIG. 11 is a fragmentary, cross sectional view taken on line 11—11 of FIG. 3.

A truck 12 is shown in FIG. 1 in its over-the-road position and in FIG. 2 in its tilted, loading, unloading position. It includes a chassis having a front frame 14 supported by front steering wheels 16 and supporting a cab 18 as well as an engine compartment 20. The chassis also includes a rear frame 22 supported by rear traction wheels 24 and supporting a cargo-receiving bed 26, the drive between the transmission and the differential not being illustrated. When the truck 12 is tilted (FIG. 2) the front frame 14 and all parts supported thereby slope upwardly and rearwardly toward the zone of interconnection between the frames 14 and 22 whereas the rear frame 22 and all parts supported thereby slope upwardly and forwardly toward such zone of interconnection.

The buckling is effected by a first double acting fluid pressure (e.g., hydraulic) piston and cylinder assembly 28 having a cylinder 30 pivotally connected to the frame 22 and a forwardly extending rod 32 capable of causing the frames 14 and 22 to swing relatively about a first pair of transversely spaced pivot pins 34 disposed downwardly and forwardly of the rod 32.

A system of linkages 36 interposed between the rod 32 and the frame 14 includes a first link 38 and second link 40 both rigid to and extending radially from a shaft 42 that is, in turn, rotatably carried by the frame 22. The links 38 and 40 are interconnected at their outer ends by a second pin 44 which pivotally receives a yoke 46 on the rod 32 disposed between the links 38 and 40. A third link 48 radiating from the shaft 42 and spaced from the triangular link 40 has a third cross pin 50 which receives the rear end of a fourth link 52, the latter being disposed between the links 40 and 48 and extending forwardly from the pin 50. The somewhat crescent-shaped control link 52 has a notch 54 for clearing the shaft 42 and a turnbuckle 56 (for adjustment purposes) connects the forward end of the link 52 with a small block 58 swingably carried by the front frame 14.

The rear frame 22 has a pair of spaced, longitudinal frame pieces. The bed 26 is in turn supported by a pair of spaced channels 62, each partially embracing a corresponding framepiece 60 and slidable longitudinally thereof fore and aft of the rear frame 22. Each channel 62 has a bearing strip 64 (FIG. 11) overlying its framepiece 60 made, for example, from an ultra high molecular weight polyethylene material.

A second double acting fluid pressure (e.g., hydraulic) piston and cylinder assembly 66 underlying the bed 26 has its cylinder 68 connected to a cross member 70 between the framepieces 60 to which the cylinder 30 is also connected. The rearmost end of piston rod 72 of the assembly 66 is secured in any suitable manner to the bed 26 at its rearmost ends. The frames 14 and 22 have abutments 74 at each side thereof just above the pins 34 which normally interengage (FIGS. 1 and 4) and are spread apart when the truck 12 is tilted (FIGS. 2 and 8).

OPERATION

Normally, the rod 72 is retracted, maintaining the front end of the bed 26 adjacent the cab 18 (FIG. 1) and the rod 32 is retracted (FIGS. 3 and 5–7) holding the truck 12 in its untilted condition. At that time, the linkages 36 are past center, with the shaft 42 received in the notch 54, locking the frames 14 and 22 in place as indicated by a line 76 in FIG. 7 extending below the shaft 42 through pin 50 and through axis 78 of swinging movement of the block 58.

Extension of the rod 32 exerts a rearward pull on the links 38 and 40 to in turn pull the link 48 rearwardly and cause the link 52 to swing upwardly, then forwardly such that the notch 54 clears the shaft 42, resulting therefore, in opposite tilting of the frames 14 and 22 about the axes of the pins 34. Extension of the rod 72 shifts the bed 26 to a position where its rear ramp end 80 rests on surface 82 which supports the wheels 16 and 24 to permit loading or unloading of the inclined bed 26 with cargo. Fluid retention in both of the cylinders 30 and 72 holds the frames 14 and 22 in their normal essentially end-to-end, horizontal position and the front end of the bed 26 adjacent the cab 18.

I claim:

1. In a self-propelled, automotive chassis having a front, cab-supporting frame and a rear, bed-supporting frame normally disposed in essentially end-to-end relationship to the front frame with both frames substantially horizontal, an articulation interconnecting the proximal ends of the frames for up and down tilting movement of both frames about a normally horizontal axis, power means pivotally connected to the rear frame for tilting the frames, and structure operably coupling the power means with the front frame, said structure comprising:

a system of linkages interconnecting the frames and coupled with said power means for tilting the frames upon actuation of said power means, said system of linkages comprising:

link means mounted on the rear frame for swinging movement about an axis parallel with said horizontal axis;

means coupling the link means with said power means for swinging the link means upon actuation of the power means; and a control link pivotally interconnecting the link means and the front frame for tilting the frames during swinging of the link means.

2. The invention of claim 1, said control link provided with releasable means normally locking the frames in their substantially horizontal positions.

3. The invention of claim 1, said control link movable to an over center position, presenting said releasable locking means.

4. The invention of claim 3, said link means swingable above said articulation.

5. The invention of claim 4; and abutment means for normally holding the frames against downward movement at their proximal ends beyond their normal, substantially horizontal position.

6. The invention of claim 5; and a turnbuckle connecting said control link to said front frame.

* * * * *